United States Patent [19]

Sakakiyama

[11] Patent Number: 4,662,496

[45] Date of Patent: May 5, 1987

[54] SYSTEM FOR CONTROLLING THE CLUTCH TORQUE OF AN ELECTROMAGNETIC CLUTCH FOR VEHICLES

[75] Inventor: Ryuzo Sakakiyama, Tokyo, Japan

[73] Assignee: Fuji Jukogyo Kabushiki Kaisha, Tokyo, Japan

[21] Appl. No.: 685,280

[22] Filed: Dec. 24, 1984

[30] Foreign Application Priority Data

Dec. 27, 1983 [JP] Japan .................... 58-251023

[51] Int. Cl.$^4$ .............................. B60K 41/02
[52] U.S. Cl. ....................... 192/0.076; 192/0.075; 192/0.096; 192/3.56; 192/21.5
[58] Field of Search ............... 192/0.07, 0.075, 0.076, 192/0.096, 21.5, 3.56, 3.61, 3.62, 3.63

[56] References Cited

U.S. PATENT DOCUMENTS

| | | | |
|---|---|---|---|
| 3,132,728 | 5/1964 | Chaptois | 192/0.052 X |
| 4,425,992 | 1/1984 | Makita | 192/82 T |
| 4,514,811 | 4/1985 | Daubenmier et al. | 192/0.076 X |
| 4,515,257 | 5/1985 | Takano et al. | 192/0.075 |

FOREIGN PATENT DOCUMENTS 15023  1/1982  Japan ...................... 192/3.63
30624  2/1982  Japan .

*Primary Examiner*—Rodney H. Bonck
*Assistant Examiner*—David A. Testardi
*Attorney, Agent, or Firm*—Martin A. Farber

[57] ABSTRACT

A system for controlling the clutch torque of an electromagnetic clutch for a vehicle, having an accelerator pedal switch for producing an output signal when an accelerator pedal of the vehicle is released. A clutch current circuit including a transistor is provided for controlling the clutch current passing through a coil of the electromagnetic clutch. A logic gate circuit is provided to be responsive to the output signal of the accelerator pedal switch for controlling the transistor so as to decrease the clutch current to a low value approximating zero for a moment and thereafter to gradually increase the current to a predetermined value. The second circuit comprises a logic gate circuit and a pulse train generating circuit responsive to the output signal of the accelerator switch for producing a pulse train controlled by the logic gate circuit, and the duty ratio of the pulse train gradually varies so as to gradually increase the clutch current.

10 Claims, 4 Drawing Figures

SYSTEM FOR CONTROLLING THE CLUTCH TORQUE OF AN ELECTROMAGNETIC CLUTCH FOR VEHICLES

BACKGROUND OF THE INVENTION

The present invention relates to a system for controlling the clutch torque of an electromagnetic clutch disposed between an engine and a transmission of a motor vehicle, and more particularly to a system for controlling the variation of the clutch torque from a high clutch torque while an accelerator pedal is depressed to a low clutch torque at releasing the pedal.

Japanese Patent Application Laid-open No. 57-30624 discloses a clutch control system, in which clutch torque is maintained to a value larger than engine torque by a rated current as long as the vehicle is driven faster than a predetermined speed, irrespective of the condition of the accelerator pedal. In this construction, when the accelerator pedal is released, irregular and abrupt fluctuation occurs in engine torque which is transmitted to a driving system, giving an unpleasantly shocking the driver. Further, because a large amount of rated current is needed to be supplied to the clutch under the condition of lower engine speed while the acceleration pedal is being released, the electric power of a battery is greatly consumed.

In order to remove such drawbacks, as shown in FIG. 4, it was tried to absorb the torque variation by lowering the clutch torque to such a low value $T_2$ as long as the engine braking could be effected while the accelerator pedal was being released, although the clutch torque during the depression of accelerator pedal was fixed to a high value $T_1$, as was in the conventional art. However, by such stepwise variation in clutch torque, the transmission of the fluctuation of engine torque can not be sufficiently prevented.

On the other hand, a dashpot device has been conventionally pr9ovided for retarding the closing speed of a throttle valve when releasing the accelerator pedal in order to absorb the shock caused by the engine torque change. However, it takes a long time to lower the engine speed to an idling speed after the acceleration pedal is released, which results in high fuel consumption, and in the reduction of engine braking force, as well as complicating the construction because of the provision of a dashpot.

SUMMARY OF THE INVENTION

The object of the present invention is to provide a clutch torque control system for an electromagnetic clutch which is capable of reducing the clutch sliding by rapidly reducing the clutch torque for a moment immediately after releasing of accelerator pedal, thereby absorbing the shock caused by the transmission of engine braking force.

According to the present invention, there is provided a system for controlling the clutch torque of an electromagnetic clutch for a vehicle having an accelerator pedal for accelerating an engine to drive the vehicle. The system comprises an accelerator switch for producing an output signal when the accelerator pedal is released, a first circuit including a switching means for controlling the clutch current passing through a coil of the electromagnetic clutch, and a second circuit responsive to the output signal of the accelerator switch for controlling the switching means so as to decrease the clutch current to a low value for a moment and thereafter to gradually increase the current to a predetermined value.

The second circuit comprises a logic gate circuit and a pulse train generating circuit responsive to the output signal of the accelerator switch for producing a pulse train controlled by the logic gate circuit, and the duty ratio of the pulse train gradually varies so as to gradually increase the clutch current.

The other objects and features of this invention will be apparently understood from the following description with reference to the accompanying drawings.

DETAILED DESCRIPTION OF THE PREFERRED EMBODIMENT

Figure 1:
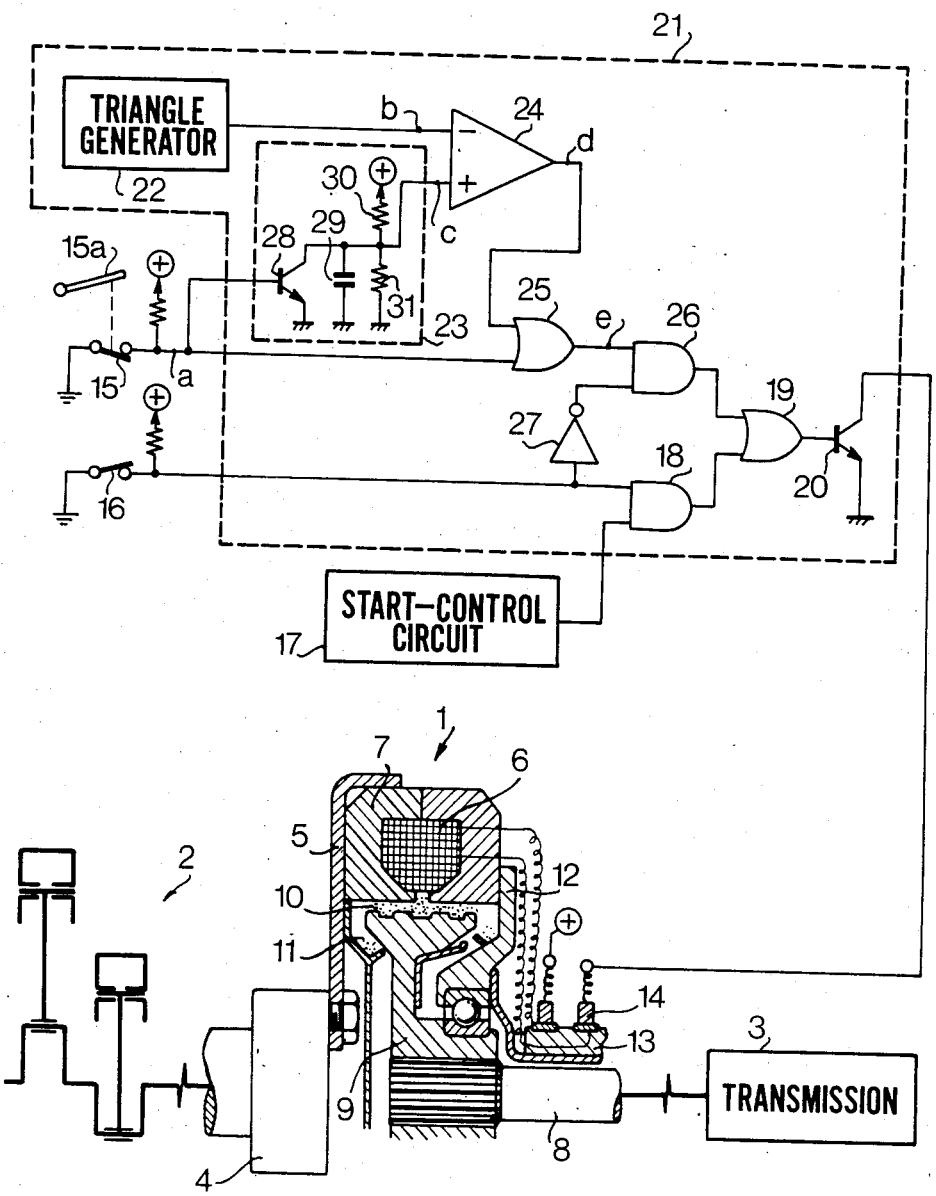
FIG. 1 is a schematic diagram showing an embodiment of the present invention.

Referring to FIG. 1, an electromagnetic powder clutch 1 is provided for transmitting power of an engine 2 to wheels (not shown) of a vehicle through a manual or belt-drive infinitely variable transmission 3. The electromagnetic powder clutch 1 comprises a drive member 7 connected to a crankshaft 4 of the engine 2 through a drive plate 5, a coil 6 provided in the drive member 7, a driven member 9 having its outer periphery spaced from the inner periphery of the drive member 7 by a gap 10, and a powder chamber 11 defined between the drive member 7 and driven member 8. The powder chamber 11 is filled with magnetic powder material. The driven member 9 is secured to an output shaft 8 of the belt-drive type infinitely variable transmission 3. A holder 12 secured to the drive member 7 carries slip rings 13 which are electrically connected to the coil 6. The coil 6 is supplied through brushes 14 and slip rings 13 with a clutch current from a control unit 21.

When the magnetizing coil 6 is excited by the clutch current, drive member 7 is magnetized to prodice a magnetic flux passing through the driven member 9. The magnetic powder is aggregated in the gap 10 by the magnetic flux and the driven member 9 is engaged with the drive member 7 by the powder. On the other hand, when the clutch current is cut off, the drive and driven members 7 and 9 are disengaged from one another. The transmission ratio of the belt-drive type infinitely variable transmission 3 is decided in dependency on the engine speed and the vehicle speed. When the vehicle speed is lower than a predetermined low value, the transmission ratio is at the highest ratio. When the engine speed is at high value, the transmission ratio becomes low.

An acclerator pedal switch 15 for detecting the depression of an accelerator pedal 15a is turned off to produce a high level output when the pedal 15a is depressed, and is turned on to produce a low level output when the pedal is released. A vehicle speed switch 16 is provided to be turned on to produce a low level output when the vehicle speed exceeds a predetermined level. The vehicle speed switch 16 and a start-control circuit 17 are connected to the clutch coil 6 through an AND gate 18, an OR gate 19 and a driving transistor 20 in the control circuit 21. A triangle generator 22 and a reference voltage generator 23 connected to the output of the accelerator switch 15 are connected to inputs of a comparator 24, the output of which is connected to an OR gate 25. The vehicle speed switch 16 is connected to an AND gate 26 through an inverter 27, which is in turn connected to the other input of the OR gate 19.

The refernece voltage generator 23 comprises a transistor 28 which is turned on and off in response to a signal from the accelerator switch 15. When the transistor 28 is turned on in response to the signal, the reference voltage is set to zero, by discharging a capacitor 29, and when the transistor 28 is turned off, the voltage elevates gradually to a value determined by a voltage divider comprising resistors 30 and 31, by charging the capacitor 29.

Figure 2:
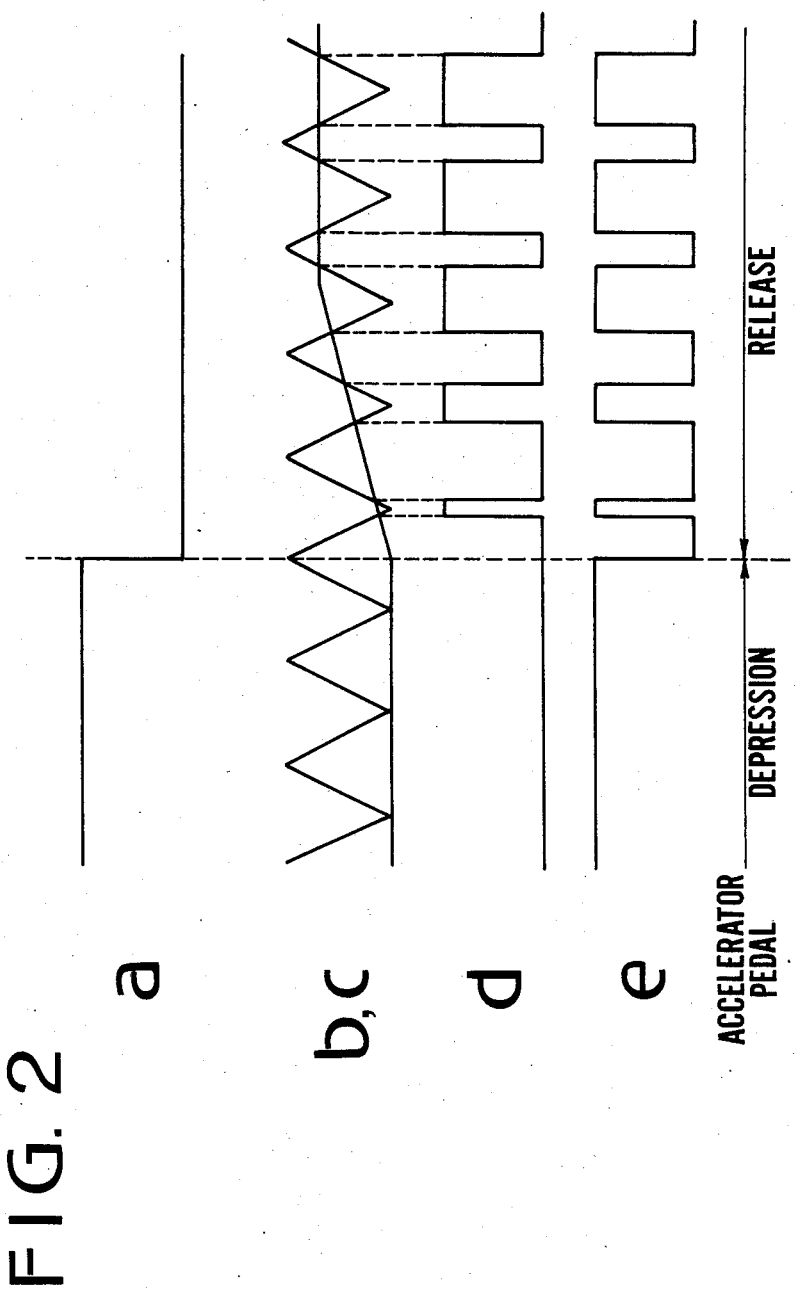
FIGS. 2(a) to (e) show waveforms of outputs at various portions of FIG. 1.

The operation of the clutch torque control system is explained hereinafter with reference to FIG. 2. At the start of the vehicle, the output of the vehicle speed switch 16 is at a high level. Accordingly, a signal from the start control circuit 17 is applied to the transistor 20 through the AND gate 18 and the OR gate 19, so that the clutch current is controlled by the signal from the start control circuit so as to perform a smooth starting of the vehicle with increase of the engine speed. When the vehicle speed exceeds a predetermined value, the vehicle speed switch 16 is closed, so that the output of the switch 16 changes to a low level. Thus, the AND gate 18 is closed to cut off the signal from the start control circuit 17. In this situation, if the accelerator pedal is being depressed, the output of the accelerator switch 15 is at a high level as shown in FIG. 2(a), so that the output of the OR gate 25 goes to a high level irrespective of the level at the other input of the OR gate, which is a maximum value as shown in FIG. 2(e). The output signal (e) is sent to the transistor 20 through the AND gate 26 and the OR gate 19 to continuously turn on it. Therefore, the clutch current reaches a maximum current to completely engage the clutch. The value of the clutch torque is set to have a high value $T_1$ as shown by $l_1$ of FIG. 3, completely engaging the clutch.

Figure 3:
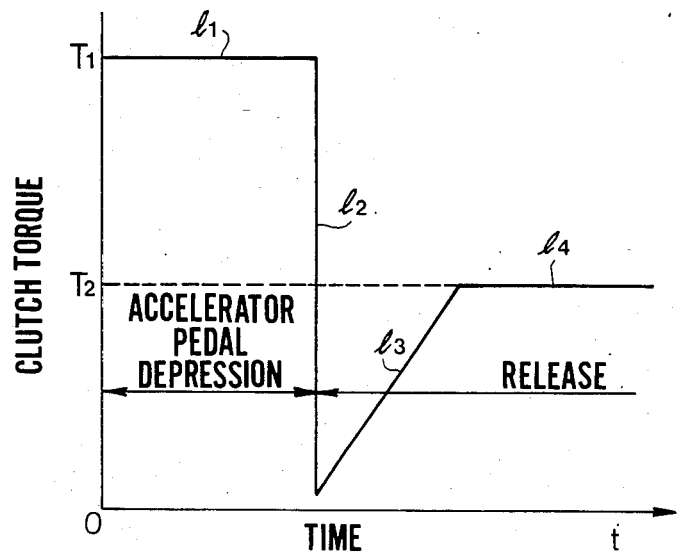
FIG. 3 is a graph showing clutch torque in the system of the present invention.
Figure 4:
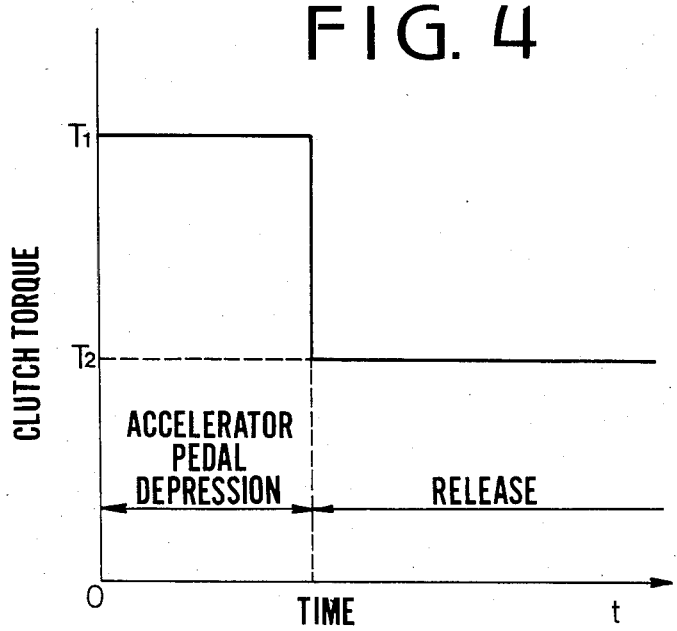
FIG. 4 is a graph showing clutch torque in a conventional system.

When the accelerator pedal is released, the level of the output from the accelerator switch 15 goes to a low level as shown in FIG. 2(a). Therefore, only the output of the comparator 24 is applied to the transistor 20 through OR gate 25, AND gate 26 and OR gate 19. The comparator 24 compares a triangular wave pulse train (b) with the reference voltage (c) to produce a rectangular pulse train (d). The duty ratio of the pulse train (d) increases with the increase of the reference voltage (c) as shown in FIG. 2(d). When the accelerator pedal is released, the duty ratio is very small, so that the clutch torque decreases to a very small value torque $l_2$ as shown in FIG. 3, approximating zero. Accordingly the clutch is almost disengaged for a moment just after releasing the accelerator pedal, whereby the abrupt change of the engine torque caused by releasing accelerator pedal is not transmitted to the transmission.

Thereafter, the clutch torque gradually increases as shown by $l_3$ in FIG. 3, as the duty ratio of the clutch current gradually increases. The duty ratio reaches a predetermined value and the clutch torque is held at a constant low level $T_2$. Thus, abrupt changes of the engine can be absorbed while preventing electric power consumption. The above described operation can also be carried out by a micro-computer system.

From the foregoing, it will be understood that the present invention provides a system which prevents the transmission of shock caused by abrupt changes in engine braking force by lowering the clutch torque almost to zero to shut off the transmission system as the acceleration pedal is released.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling the clutch torque of an electromagnetic clutch for a vehicle having an accelerator pedal for accelerating an engine to drive the vehicle, comprising:
    an accelerator switch for producing an output signal when the accelerator pedal is released;
    a first circuit, including a switching means for controlling the clutch current passing through a coil of the electromagnetic clutch;
    a second circuit responsive to the output signal of the accelerator switch for controlling the switching means so as to decrease the clutch current to a low value for a moment and thereafter to gradually increase the current to a predetermined value;
    said second circuit comprises a logic gate circuit and a pulse train generating circuit responsive to the output signal of the accelerator switch for producing a pulse train controlled by the logic gate circuit, and duty ratio of the pulse train gradually varies so as to gradually increase the clutch current, and
    the decrease in the clutch current and the subsequent gradual increase thereof both occurring while the accelerator pedal is released.

2. The system according to claim 1 wherein the pulse train generating circuit comprises a a triangle generator for producing a triangular wave pulse train, a reference voltage generator the output voltage of which gradually varies, and a comparator for comparing the triangular wave pulse train with the reference voltage and for producing a rectangular pulse train.

3. A system for controlling the clutch torque of an electromagnetic clutch for a vehicle having an accelerator pedal for accelerating an engine to drive the vehicle, comprising:
    an accelerator switch for producing an output signal when the accelerator pedal is released;
    a first circuit, including a switching means for controlling the clutch current passing through a coil of the electromagnetic clutch;
    a second circuit response to the output signal of the accelerator switch for controlling the switching means so as to decrease the clutch current to a low value for a moment and thereafter to gradually increase the current to a predetermined value;
    said second circuit comprises a logic gate circuit and a pulse train generating circuit responsive to the output signal of the accelerator switch for producing a pulse train controlled by the logic gate circuit, and duty ratio of the pulse train gradually varies so as to gradually increase the clutch current;
    the pulse train generating circuit comprises a triangle generator for producing a triangular wave pulse train, a reference voltage generator the output voltage of which gradually varies, and a comparator for comparing the triangular wave pulse train with the reference voltage and for producing a rectangular pulse train; and a vehicle speed switch for producing an output signal when vehicle speed exceeds a predetermined value, the output signal being applied to the logic gate to allow the rectangular pulse train to pass the gate.

4. The system for controlling the clutch torque of an electromagnetic clutch according to claim 1, wherein
the switching means is a transistor provided in the circuit for the clutch current.

5. The system according to claim 4 wherein
the pulse train generating circuit comprises a triangle generator for producing a triangular wave pulse train,
a reference voltage generator the output voltage of which gradually varies, and
a comparator for comparing the triangular wave pulse train with the reference voltage and for producing a rectangular pulse train.

6. A system for controlling the clutch torque of an electromagnetic clutch for a vehicle having an accelerator pedal for accelerating an engine to drive the vehicle, comprising:
an accelerator switch for producing an output signal when the accelerator pedal is released;
a first circuit, including a switching means for controlling the clutch current passing through a coil of the electromagnetic clutch;
a second circuit responsive to the output signal to the accelerator switch for controlling the switching means of as to decrease the clutch current to a low value for a moment and thereafter to gradually increase the current to a predetermined value;
said second circuit comprises a logic gate circuit and a pulse train generating circuit responsive to the output signal of the accelerator switch for producing a pulse train controlled by the logic gate circuit, and duty ratio of the pulse train gradually varies so as to gradually increase the clutch current;
the switching means is a transistor provided in the circuit for the clutch current;
the pulse train generating circuit comprises a triangle generator for producing a triangular wave pulse train,
a reference voltage generator the output voltage of which gradually varies, and
a comparator for comparing the triangular wave pulse train with the reference voltage and for producing a rectangular pulse train; and
a vehicle speed switch for producing an output signal when vehicle speed exceeds a predetermined value, the output signal being applied to the logic gate to allow the rectangular pulse train to pass the gate.

7. A system for controlling the clutch torque of an electromagnetic clutch for a vehicle having an accelerator pedal for accelerating an engine to drive the vehicle, comprising:
an accelerator switch for producing an output signal when the accelerator pedal is released;
a first circuit, including a transistor for controlling the clutch current passing through a coil of the electromagnetic clutch;
a second circuit comprises a logic gate circuit and a pulse train generating circuit responsive to the output signal of the accelerator switch for producing a pulse train controlled by the logic gate circuit;
the logic gate circuit being arranged to supply the pulse train to the base of the transistor;
the pulse train generating circuit being arranged to decrease the clutch current to a low value for a moment and thereafter to gradually vary duty ratio of the pulse train so as to gradually increase the clutch current; and
the decrease in the clutch current and the subsequent gradual increase thereof both occurring while the accelerator pedal is released.

8. A system for controlling the clutch torque of an electromagnetic clutch for a vehicle having an accelerator pedal for accelerating an engine to drive the vehicle, comprising:
an accelerator switch for producing an output signal when the accelerator pedal is released;
a first circuit, including a switching means for controlling the clutch current passing through a coil of the electromagnetic clutch;
a second circuit responsive to the output signal of the accelerator switch for controlling the switching means so as to decrease the clutch current to a low value for a moment and thereafter to gradually increase the current to a predetermined value;
said second circuit comprises a logic gate circuit and a pulse train generating circuit responsive to the output signal of the accelerator switch for producing a pulse train controlled by the logic gate circuit, and duty ratio of the pulse train gradually varies so as to gradually increase the clutch current; and
a vehicle speed switch for producing an output signal when vehicle speed exceeds a predetermined value, the output signal being applied to the logic gate to allow the pulse train to pass the gate.

9. A system for controlling the clutch torque of an electromagnetic clutch for a vehicle having an accelerator pedal for accelerating an engine to drive the vehicle, comprising:
an accelerator switch for producing an output signal when the accelerator pedal is released;
a first circuit, including a switching means for controlling the clutch current passing through a coil of the electromagnetic clutch;
a vehicle speed switch for producing an output signal when vehicle speed exceeds a predetermined value;
a second circuit responsive to the output signal of the accelerator switch and to the output signal of the vehicle speed switch for controlling the switching means so as to decrease the clutch current to a low value approximately equal to zero for a moment and thereafter to gradually increase the current to a predetermined value which is lower than a rated maximum current, when the accelerator pedal is released;
said second circuit comprises a logic gate circuit and a pulse train generating circuit responsive to the output signal of the accelerator switch for producing a pulse train controlled by the logic gate circuit, and duty ratio of the pulse train gradually varies so as to gradually increase the clutch current to the predetermined value while the accelerator pedal is released.

10. A system for controlling the clutch torque of an electromagnetic clutch for a vehicle having an accelerator pedal for accelerating an engine to drive the vehicle, comprising:
an accelerator switch for producing an output signal when the accelerator pedal is released;
a first circuit, including a transistor for controlling the clutch current passing through a coil of the electromagnetic clutch;
a vehicle speed switch for producing an output signal when vehicle speed exceeds a predetermined value;
a second circuit comprises a logic gate circuit and a pulse train generating circuit responsive to the output signal of the accelerator switch and to the output signal of the vehicle speed switch for producing a pulse train controlled by the logic gate circuit;
the logic gate circuit being arranged to supply the pulse train to the base of the transistor; and
the pulse train generating circuit being arranged to decrease the clutch current to a low value approximately equal to zero for a moment and thereafter to gradually vary duty ratio of the pulse train so as to gradually increase the clutch current to a predetermined value which is lower than a rated maximum current, when the accelerator pedal is released.

* * * * *